(12) United States Patent
De Block et al.

(10) Patent No.: US 8,359,701 B2
(45) Date of Patent: Jan. 29, 2013

(54) WIPER BLADE

(75) Inventors: Peter De Block, Halen (BE); Jan Bonroy, Heverlee (BE); Hans Braun, Tienen (BE); Hans Beelen, Herk de Stad (BE); Bart Fatan, Kermt (BE); Eric Windmolders, Kermt (BE); Liesbet van Vinckenroye, Tienen (BE); Edwin Luypaerts, Balen (BE); Robert Vertongen, Heusden-Zolder (BE); Marcello Bubba, Heverlee (BE); Herve Bratec, Wilsele (BE)

(73) Assignee: Robert Bosch GmbH, Stuttgart (DE)

( * ) Notice: Subject to any disclaimer, the term of this patent is extended or adjusted under 35 U.S.C. 154(b) by 1122 days.

(21) Appl. No.: 12/297,366

(22) PCT Filed: Mar. 28, 2007

(86) PCT No.: PCT/EP2007/052965
§ 371 (c)(1),
(2), (4) Date: Oct. 16, 2008

(87) PCT Pub. No.: WO2007/124989
PCT Pub. Date: Nov. 8, 2007

(65) Prior Publication Data
US 2009/0089956 A1    Apr. 9, 2009

(30) Foreign Application Priority Data

May 3, 2006    (DE) .......................... 10 2006 020 524

(51) Int. Cl.
*B60S 1/38*    (2006.01)

(52) U.S. Cl. ............ 15/250.201; 15/250.43; 15/250.361
(58) Field of Classification Search ............. 15/250.201, 15/250.43, 250.44, 250.361, 250.451–250.454
See application file for complete search history.

(56) References Cited

U.S. PATENT DOCUMENTS

| | | | | |
|---|---|---|---|---|
| 3,780,395 | A * | 12/1973 | Quinlan et al. ............ | 15/250.43 |
| 6,516,491 | B2 * | 2/2003 | Merkel et al. ............ | 15/250.201 |
| 6,588,048 | B2 * | 7/2003 | Ohyama .................... | 15/250.43 |
| 6,874,195 | B2 * | 4/2005 | Kotlarski et al. ......... | 15/250.201 |
| 7,028,368 | B2 * | 4/2006 | Lee et al. .................. | 15/250.201 |
| 7,150,066 | B1 * | 12/2006 | Huang ....................... | 15/250.201 |
| 7,464,433 | B2 | 12/2008 | Thomar et al. | |
| 2004/0098821 | A1 | 5/2004 | Kraemer et al. | |

(Continued)

FOREIGN PATENT DOCUMENTS

| | | |
|---|---|---|
| DE | 10044913 A1 | 12/2001 |
| DE | 10334609 A1 | 6/2004 |

(Continued)

OTHER PUBLICATIONS

PCT/EP2007/052965 International Search Report.

*Primary Examiner* — Gary Graham
(74) *Attorney, Agent, or Firm* — Michael Best & Friedrich LLP

(57) ABSTRACT

The invention is based on a wiper blade (12) with a wiper strip (14) which has a wiper lip (16) and a head strip (20) which is integrally formed on said wiper lip and, in a first longitudinal channel (26), has a supporting element in the form of a spring rail (18) with a flat cross section, and has a spoiler (22, 38, 46) on that side which faces away from the wiper lip (16). It is proposed that the spoiler (22, 38, 46) surrounds the head strip (20) on its longitudinal sides by means of guide rails (40).

17 Claims, 4 Drawing Sheets

U.S. PATENT DOCUMENTS

| | | | |
|---|---|---|---|
| 2004/0181894 A1* | 9/2004 | Lee et al. | 15/250.201 |
| 2006/0037167 A1 | 2/2006 | Nacamuli | |
| 2006/0156529 A1* | 7/2006 | Thomar et al. | 29/450 |
| 2007/0017056 A1* | 1/2007 | Cooke et al. | 15/250.201 |

FOREIGN PATENT DOCUMENTS

| | | |
|---|---|---|
| DE | 10350274 A1 | 9/2004 |
| DE | 10312979 A1 | 10/2004 |
| DE | 102005009205 A1 | 10/2005 |
| FR | 2851976 | 9/2004 |
| JP | 9039743 | 2/1997 |
| JP | 2003534973 | 11/2003 |
| WO | 00/07856 A2 | 2/2000 |
| WO | 2005108177 | 11/2005 |

* cited by examiner

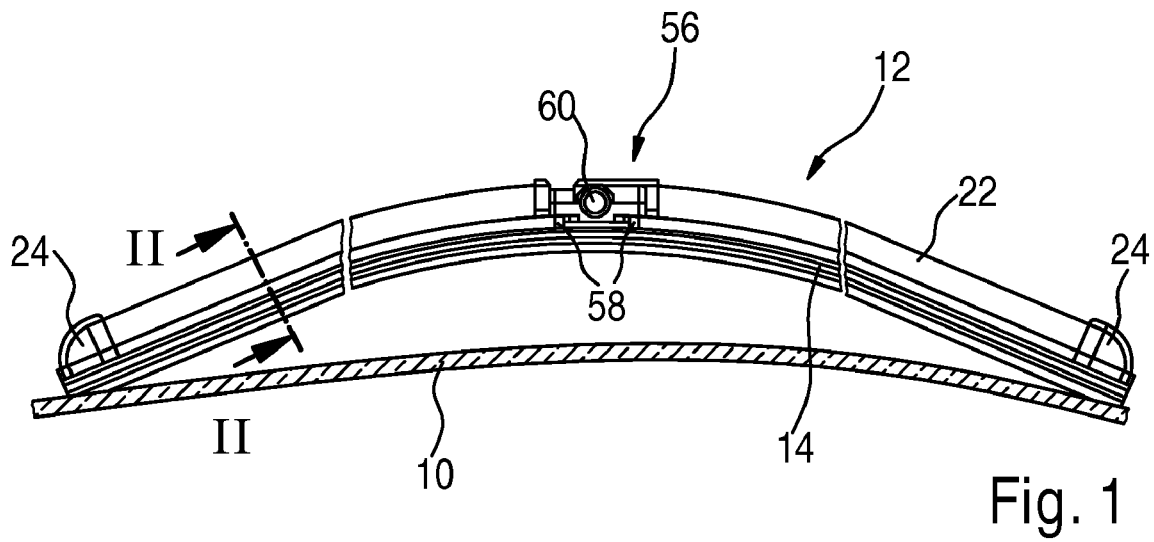
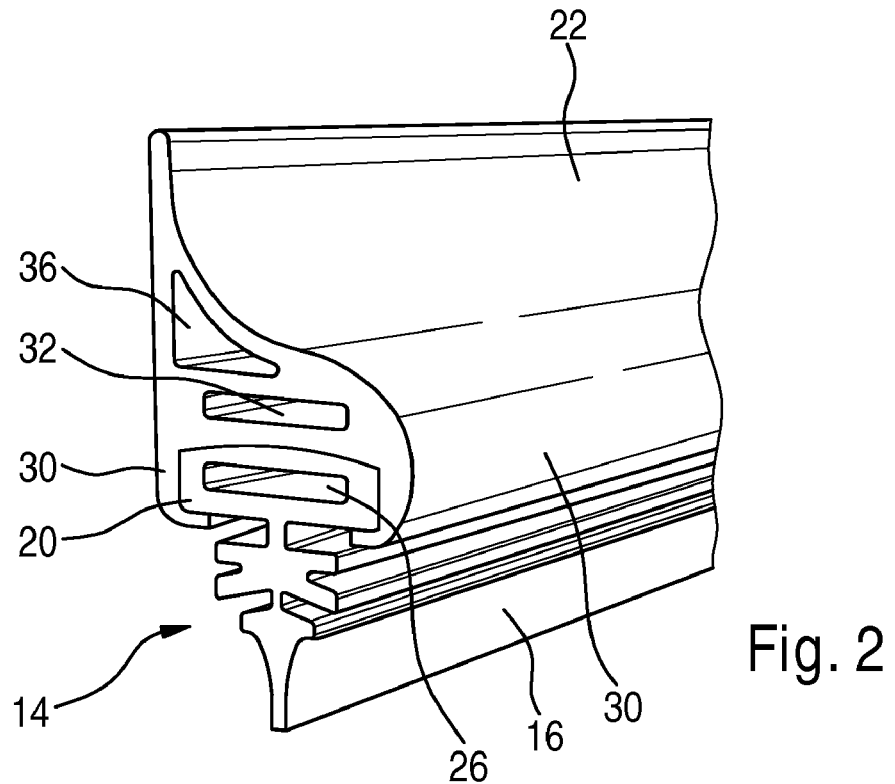

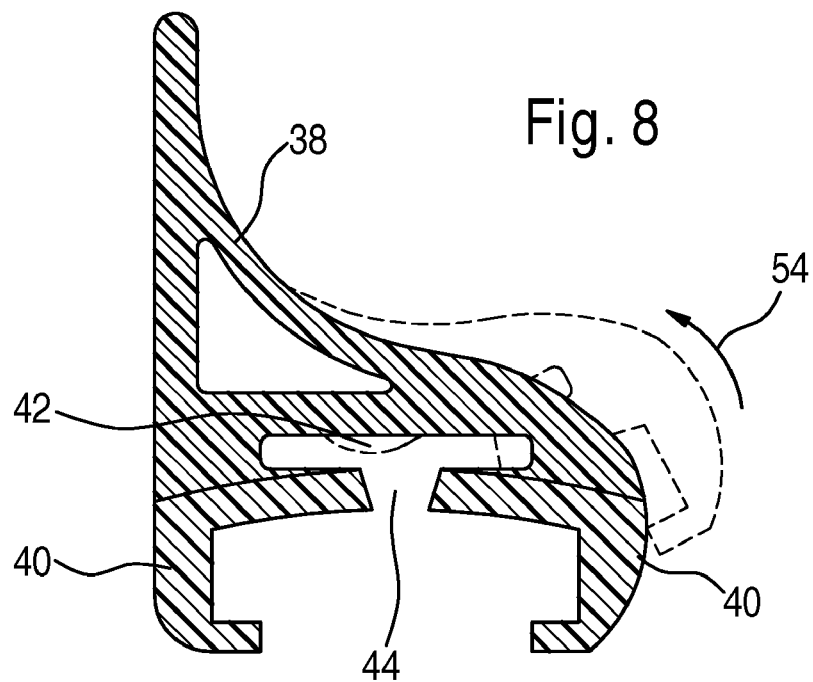
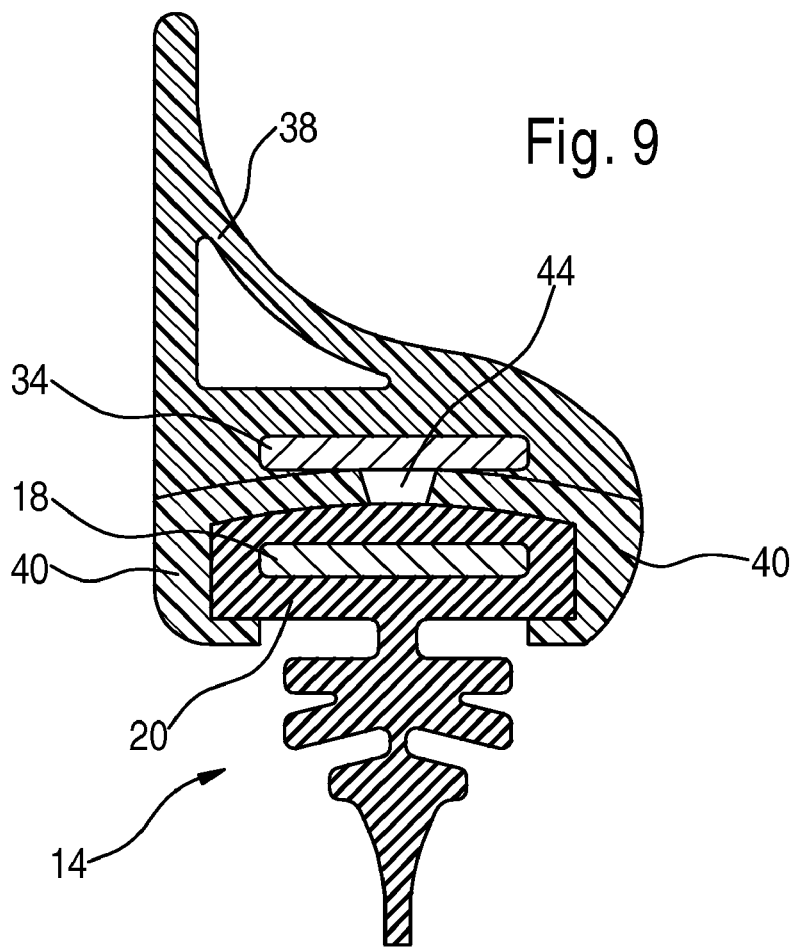

WIPER BLADE

BACKGROUND OF THE INVENTION

The invention relates to a wiper blade.

DE 198 35 065 A1 discloses a joint-free wiper blade, the basic body of which consists essentially of a head strip, on which a wiper lip is integrally formed via a tilting web. The head strip possesses a longitudinal duct in which a spring-elastic carrying element is embedded. The latter has a rectangular cross section, the wide side running approximately parallel to the vehicle windshield. The width of the carrying element decreases from the middle region toward the ends. The carrying element, due to its curvature, persists during operation a prestress such that the wiper blade bears with its wiper lip against the vehicle windshield with suitable pressure force. That side of the head strip which faces away from the wiper lip is flat and possesses a uniform wall thickness with respect to the longitudinal duct. On the back of the head strip, in the middle region of the wiper blade, an adapter is attached which serves for connecting the wiper blade to a wiper arm and which laterally surrounds the head strip in the region of the carrying element by means of claws.

A joint-free wiper blade with a head strip, on which a wiper lip is integrally formed in the conventional way, is known from DE 10 334 609 A1. The head strip has a longitudinal duct for receiving a spring-elastic carrying element having a cross section running in an elongate manner transversely with respect to the wiper lip. On the cover side of the head strip which faces away from the wiper lip, a spoiler is integrally formed. This may consist of the same material as the head strip or of a softer material. In both cases, the wiper blades are expediently produced by an extrusion method.

Furthermore, DE 10 2005 009 205 A1 discloses a joint-free wiper blade with a wiper strip, the head strip of which has two lateral longitudinal grooves and of which the cover side, which faces away from a wiper lip, is connected to an elongate spring-elastic carrying element. The latter has a rectangular cross section in a direction transverse with respect to the head strip. The carrying element and part of the head strip are surrounded by a guide rail which engages with longitudinally running legs into the lateral longitudinal grooves of the head strip. The guide rail is itself guided in a guide profile of a spoiler, so that the spoiler is firmly connected to the wiper strip.

SUMMARY OF THE INVENTION

According to the invention, the spoiler is designed as a separate component and with guide rails surrounds the head strip on its longitudinal sides. The spoiler can thereby be produced independently of the wiper strip from a material which, on the one hand, impedes the pressure force of the wiper blade only slightly and, on the other hand, allows good lateral guidance. In this case, it may be expedient that the guide rails are extruded on the spoiler and have a higher hardness than the remaining spoiler.

In order to reduce the weight of the spoiler and improve its flexibility, it is advantageous that the spoiler possesses, on that side of the head strip which faces away from the wiper lip, at least one second longitudinal duct which runs parallel to the first longitudinal duct and which has a similar cross section to the first longitudinal duct. As a result, during the mounting of the wiper strip, the guide rails can be bent up elastically outward, so that the wiper strip does not have to be pushed in the longitudinal direction of the spoiler between the guide rails, but, instead, can be inserted transversally with respect to the spoiler between the guide rails. At least one end piece closed on the end face can thus be formed integrally on the spoiler, with the result that at least one of the otherwise conventional end caps of the wiper blade may be dispensed with. The second longitudinal duct may advantageously be connected via a longitudinal gap to the space between the guide rails for receiving the head strip. The longitudinal gap is conducive to bending up the guide rails, particularly when these consist of a harder material than the remaining spoiler.

Moreover, the second longitudinal duct may receive a second spring rail which, together with the first spring rail, forms the carrying element. This affords further possibilities for modifying the overall spring rigidity of the carrying element, in that the cross section of one and/or of both spring rails varies in its width and/or height over the length of the spring rail. The spring properties of the spring rails can thereby be modified within wide limits, so that the pressure forces over the length of the wiper blade can be adapted optimally to the stipulations of the respective application. As a rule, the width and/or the height will increase from the ends of the spring rail toward its middle region. Basically, other characteristics may also be implemented, in which the width and/or the height increase or decrease in a wavy or stepped manner.

The second spring rail, which runs parallel to the first spring rail in the spoiler, may be modified in its cross section in the same way as the first spring rail. Moreover, the two spring rails may possess different lengths, preferably the second spring rail being selected to be shorter than the first spring rail. After the mounting of the wiper strip, the second spring rail is pushed into the spoiler in the longitudinal direction. In the mounted state, said second spring rail stiffens the spoiler profile and blocks the guide rails, so that these can no longer be bent up laterally.

BRIEF DESCRIPTION OF THE DRAWINGS

Further advantages may be gathered from the following drawing description. Exemplary embodiments of the invention are illustrated in the drawing. The drawing, description and claims contain numerous features in combination. A person skilled in the art will expediently also consider the features individually and combine them into appropriate further combinations.

In the drawing:

FIG. 1 shows a side view of a wiper blade according to the invention,

FIG. 2 shows a perspective section along the line II-II in FIG. 1,

FIG. 8 shows a cross section through a spoiler with extruded-on guide rails for the wiper strip, and FIG. 9 shows a cross section through a spoiler according to FIG. 8 with a mounted wiper strip having two carrying elements.

DETAILED DESCRIPTION

FIG. 1 shows a non-loaded wiper blade 12 on a vehicle windshield 10. It possesses a wiper strip 14 with a wiper lip 16

Figure 4:
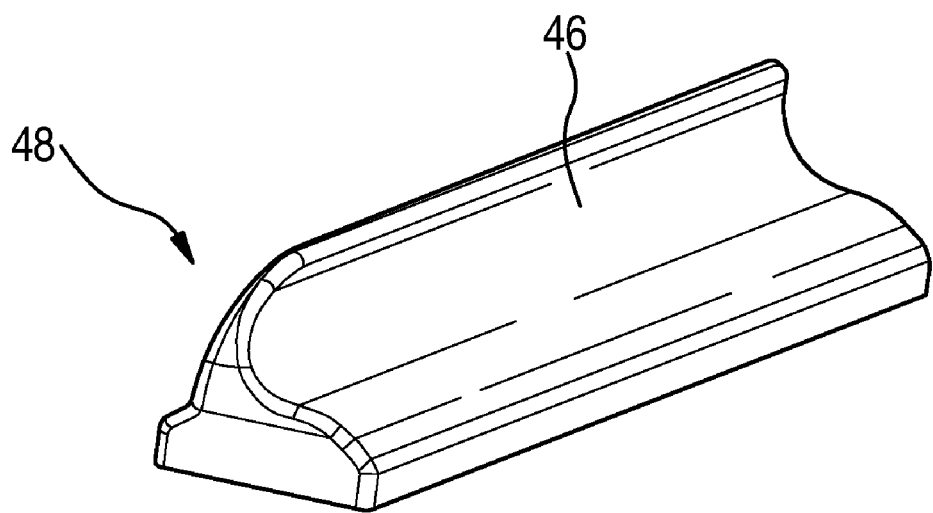
FIG. 4 shows a perspective view of one end of the wiper blade as a variant of FIG. 1.

(FIG. 2) which is connected in the conventional way to a head strip 20. On that side of the head strip 20 which faces away from the wiper lip 16, a spoiler 22 is provided, which laterally surrounds the head strip 20 by means of guide rails 30. End caps 24 are placed at the ends of the wiper blade 12. At least one of these may be dispensed with if it is replaced by an end piece which is integrally formed on the spoiler 22 and which is designated by 48 in the version according to FIG. 4 in the case of a spoiler 46.

Located in the head strip 20 is a longitudinal duct 26 for receiving a first spring rail 18 which serves as a carrying element for the wiper blade 12. The spring rail 18 is bent forward such that, in the non-loaded state (FIG. 1), it imparts to the wiper blade 12 a curvature which is greater than the greatest curvature of the vehicle windshield 10. A wiper arm, not illustrated, transmits to a connection element 56, having a hub 60 and fastened to the wiper blade 12 by means of claws 58, a pressure force which presses the wiper lip 16 of the wiper blade 12 onto the vehicle windshield 10, the aim being to achieve over the length of the wiper lip 16 an optimal pressure distribution which influences the wiping quality. The pressure distribution depends, inter alia, on the curvature of the vehicle windshield 10 and on the carrying element in the form of the spring rail 18 and also on its spring properties. These are determined, on the one hand, by the material and, on the other hand, by the cross-sectional distribution of the spring rail 18 over the length.

Figure 5:
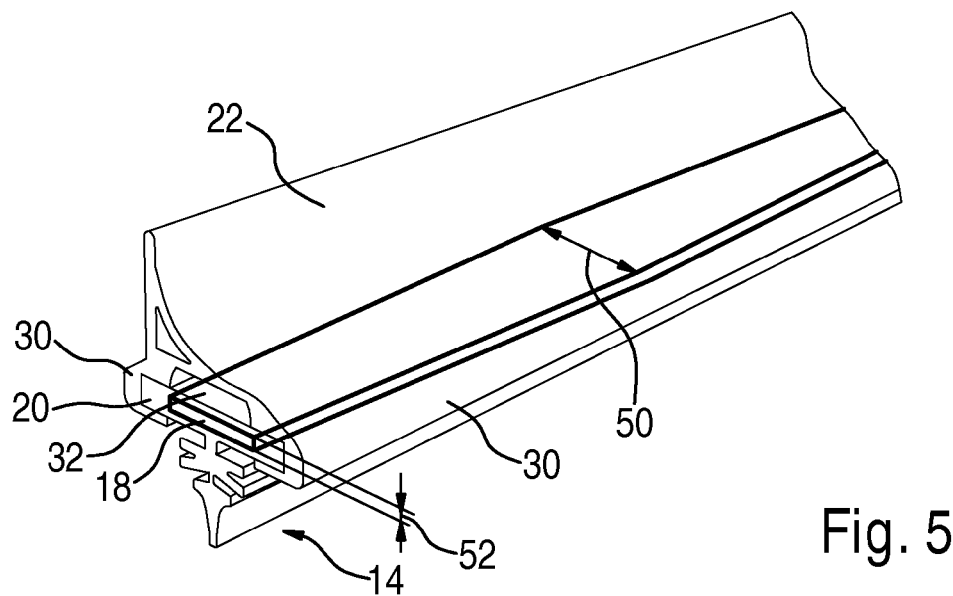
FIG. 5 shows a perspective and partially transparent view of a wiper blade with a carrying element which has a variable cross section over its length.

The spring rail 18 illustrated in FIG. 5 possesses a width 50 and a height 52 which increase from the ends toward the middle region. This may take place continuously or in a stepped manner. Narrower regions may alternate with wider regions or flatter regions may alternate with higher regions. As a further possibility of a variation, there are modifications in which only the width 50 or the height 52 is varied or the variations are carried out in combination and are co-ordinated correspondingly with one another.

Figure 6:
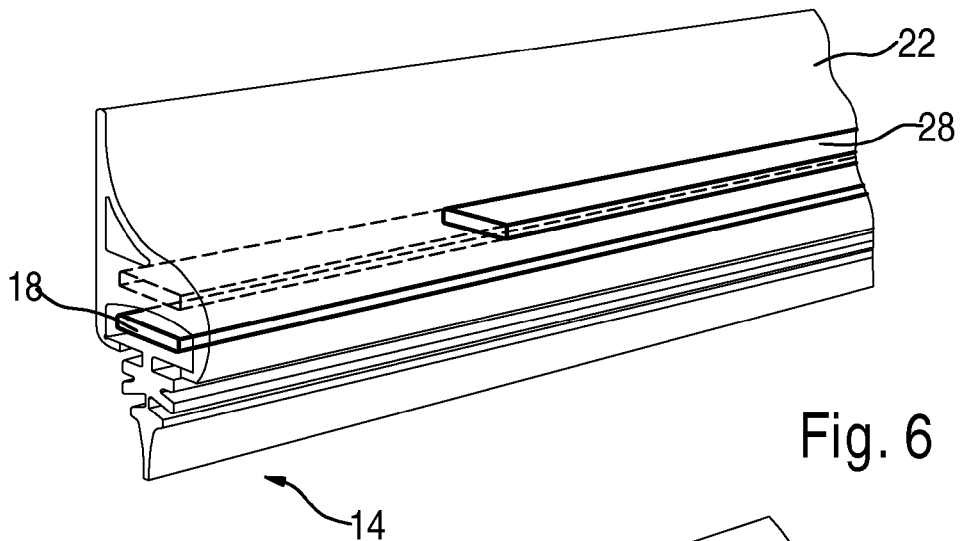
FIG. 6 shows a perspective and partially transparent view of a wiper blade with a first carrying element with which a second carrying element is arranged in a longitudinal duct of the spoiler.
Figure 7:
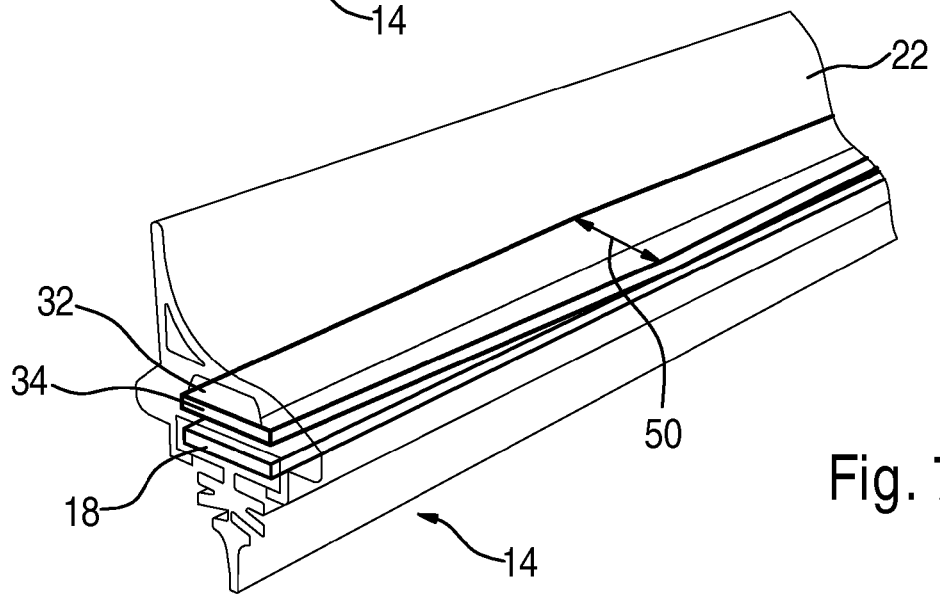
FIG. 7 shows a variant of FIG. 6.

In the version according to FIG. 6, the carrying element consists of two spring rails 18 and 28, the first spring rail 18 being accommodated in the longitudinal duct 26 of the head strip 20, while the second spring rail 28 is arranged in a longitudinal duct 32 of the spoiler 22. The second spring rail 28, which runs at a distance from and parallel to the first spring rail 18 on that side of the head strip 20 which faces away from the wiper lip 16, may be modified in the same way as the first spring rail 18. Furthermore, the spring rails 18, 28 may have different lengths, with the cross section remaining the same, or in addition to the other modifications. In the example illustrated, the second spring rail 28 is shorter than the first spring rail 18. Basically, however, the first spring rail 18 may also be the shorter. As compared with the version according to FIG. 6, in the version according to FIG. 7 the spring rails 18 and 34 possess an identical length, but their width 50 varies over their length.

Figure 3:
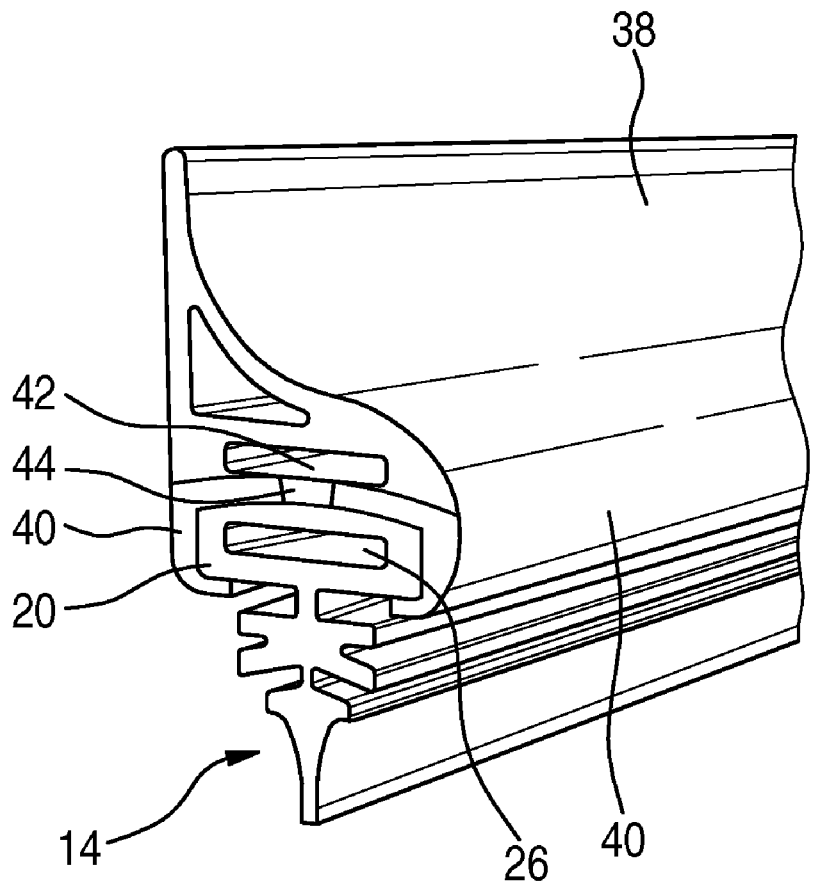
FIG. 3 shows a variant of FIG. 1.

The material of the spoiler 22 may be selected such that the spoiler 22, in conjunction with the longitudinal duct 32 and, if appropriate, with a further longitudinal duct 36, is flexible such that its guide rails 30 can be elastically bent up laterally in order to mount the wiper strip 14. The wiper strip 14 therefore does not have to be mounted in the longitudinal direction of the spoiler 22, but, instead, can be inserted transversely thereto between the guide rails 30. This operation may be made easier in that, as shown in the exemplary embodiment according to FIG. 3, FIG. 8 and FIG. 9, the longitudinal duct 42 in the spoiler 38 is connected via a longitudinal gap 44 to the interspace between the guide rails 40. In this case, as depicted by dashed lines in FIG. 8, the spoiler 38 can easily be bent up in the direction of the arrow 54.

The longitudinal gap 44 is advantageous, above all, when the spoiler 38 consists of two materials, specifically of a harder material for the guide rails 40 and of a softer material for the remaining spoiler 38. What is thereby achieved at the same time is that, along with a good lateral guidance of the wiper strip 14, the spoiler 38 possesses a high flexibility in the longitudinal direction perpendicularly to the vehicle windshield 10.

To mount the wiper blade 12, first, the first spring rail 18 is inserted into the longitudinal duct 26 of the head strip 20. The head strip 20 is thereafter inserted into the bent-up profile of the spoiler 38. To stiffen and block the guide rails 40, finally, the second spring rail 34 is inserted into the longitudinal duct 42 of the spoiler 38, so that the guide rails 40 can no longer be bent up laterally in the direction of the arrow 54 (FIG. 9). The configuration possibilities according to the invention give rise to so many variation possibilities that all possible applications can be covered by the wiper blade 12.

The invention claimed is:

1. A wiper blade (12) with a wiper strip (14) which possesses a wiper lip (16) and a head strip (20) which is integrally formed on the wiper lip and which has in a first longitudinal duct (26) a carrying element in the form of a spring rail (18) of flat cross section and which carries a spoiler (22, 38, 46) on its side facing away from the wiper lip (16), characterized in that the spoiler (22, 38, 46) surrounds the head strip (20) on its longitudinal sides by means of guide rails (30, 40), characterized in that the first longitudinal duct (26) substantially surrounds the spring rail (18), and characterized in that the spoiler (22, 38, 46) possesses, on that side of the head strip (20) which faces away from the wiper lip (16), at least one second longitudinal duct (32, 42) which runs parallel to the first longitudinal duct (26) and which has a substantially identical cross section to the first longitudinal duct (26).

2. The wiper blade (12) as claimed in claim 1, characterized in that the guide rails (40) are extruded on the spoiler (22, 38, 46) and have a higher hardness than the remaining spoiler (22, 38, 46).

3. The wiper blade (12) as claimed in claim 2, characterized in that at least one end piece (48) closed on an end face is integrally formed on the spoiler (46).

4. The wiper blade (12) as claimed in claim 3, characterized in that the second longitudinal duct (32, 42) is connected via a longitudinal gap (44) to a space between the guide rails (40) for receiving the head strip (20).

5. The wiper blade (12) as claimed in claim 4, characterized in that the carrying element comprises a second spring rail (28, 34) positioned in the second longitudinal duct (32, 42) in the spoiler (22, 38, 46).

6. The wiper blade (12) as claimed in claim 5, characterized in that the carrying element (18, 28, 34) has a cross section which varies in its width and/or height over the length of the spring rail (18).

7. The wiper blade (12) as claimed in claim 6, characterized in that the first spring rail (18) possesses a different length, as compared with the second spring rail (28, 34).

8. The wiper blade (12) as claimed in claim 7, characterized in that the cross section of one and/or of both spring rails (18, 28, 34) varies in its width (50) and/or height (52) over their length.

9. The wiper blade (12) as claimed in claim 6 characterized in that the cross section of one and/or of both spring rails (18, 28, 34) varies in its width (50) and/or height (52) over their length.

10. The wiper blade (12) as claimed in claim 5 characterized in that the first spring rail (18) possesses a different length, as compared with the second spring rail (28, 34).

11. The wiper blade (12) as claimed in claim 5 characterized in that the cross section of one and/or of both spring rails (18, 28, 34) varies in its width (50) and/or height (52) over their length.

12. The wiper blade (12) as claimed in claim 1, characterized in that at least one end piece (48) closed on an end face is integrally formed on the spoiler (46).

13. The wiper blade (12) as claimed in claim 1, characterized in that the second longitudinal duct (32, 42) is connected via a longitudinal gap (44) to a space between the guide rails (40) for receiving the head strip (20).

14. The wiper blade (12) as claimed in claim 1, characterized in that the carrying element comprises a second spring rail (28, 34) positioned in the second longitudinal duct (32, 42) in the spoiler (22, 38, 46).

15. The wiper blade (12) as claimed in claim 14, characterized in that the first spring rail (18) possesses a different length, as compared with the second spring rail (28, 34).

16. The wiper blade (12) as claimed in claim 14, characterized in that the cross section of one and/or of both spring rails (18, 28, 34) varies in its width (50) and/or height (52) over their length.

17. The wiper blade (12) as claimed in claim 1, characterized in that the carrying element (18, 28, 34) has a cross section which varies in its width and/or height over the length of the spring rail (18).

\* \* \* \* \*

UNITED STATES PATENT AND TRADEMARK OFFICE
CERTIFICATE OF CORRECTION

PATENT NO. : 8,359,701 B2  Page 1 of 1
APPLICATION NO. : 12/297366
DATED : January 29, 2013
INVENTOR(S) : De Block et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1123 days.

Signed and Sealed this
First Day of September, 2015

Michelle K. Lee
*Director of the United States Patent and Trademark Office*